(12) United States Patent
Fukui

(10) Patent No.: US 7,095,510 B2
(45) Date of Patent: Aug. 22, 2006

(54) POINT DIFFRACTION INTERFEROMETER WITH ENHANCED CONTRAST

(75) Inventor: Kenji Fukui, Sagamihara (JP)

(73) Assignee: Pulstec Industrial Co., Ltd., Hamamatsu (JP)

( * ) Notice: Subject to any disclaimer, the term of this patent is extended or adjusted under 35 U.S.C. 154(b) by 307 days.

(21) Appl. No.: 10/726,821

(22) Filed: Dec. 2, 2003

(65) Prior Publication Data

US 2004/0109168 A1   Jun. 10, 2004

(30) Foreign Application Priority Data

Dec. 5, 2002   (JP) ............................. 2002-353520

(51) Int. Cl.
*G01B 9/02* (2006.01)
(52) U.S. Cl. ...................... 356/521; 356/515
(58) Field of Classification Search ................ 356/515, 356/521, 489, 495, 512
See application file for complete search history.

(56) References Cited

U.S. PATENT DOCUMENTS 6,266,147 B1 *  7/2001  Naulleau ................... 356/515

FOREIGN PATENT DOCUMENTS

JP     57-64139 A     4/1982
JP     08-297009 A    11/1996

* cited by examiner

*Primary Examiner*—Hoa Q. Pham
*Assistant Examiner*—Marissa J Detschel
(74) *Attorney, Agent, or Firm*—Fish & Richardson P.C.

(57) ABSTRACT

The interferometer has a diffraction grating 21, a condenser lens 22, a transparent substrate 23, a field lens 24 and an imaging device 25 arranged in this order. The transparent substrate 23 is arranged at the position in the optical axis direction where both focal spots of a zeroth-order diffracted light L21 and a first-order diffracted light L22 are formed. Formed on the transparent substrate 23 is a circular opaque zone 23a whose central position is the central position of the focal spot of the first-order diffracted light L22. Formed at the center of the opaque zone 23a is a pinhole 23b whose central position is the central position of the focal spot of the first-order diffracted light L22. The contrast of the interference fringes observed on the image device 25 is enhanced by the optical interference between the first-order diffracted light L22 passing through the pinhole 23b and the zeroth-order diffracted light L21 passing through the transparent substrate 23.

22 Claims, 5 Drawing Sheets

POINT DIFFRACTION INTERFEROMETER WITH ENHANCED CONTRAST

BACKGROUND OF THE INVENTION

1. Field of the Invention

The present invention relates to an interferometer that is applied to test a performance of a beam itself emitted from various optical equipment or optical components or a performance of various optical equipment or optical components themselves, for measuring a wavefront of a beam.

2. Description of the Prior Arts

Figure 13:
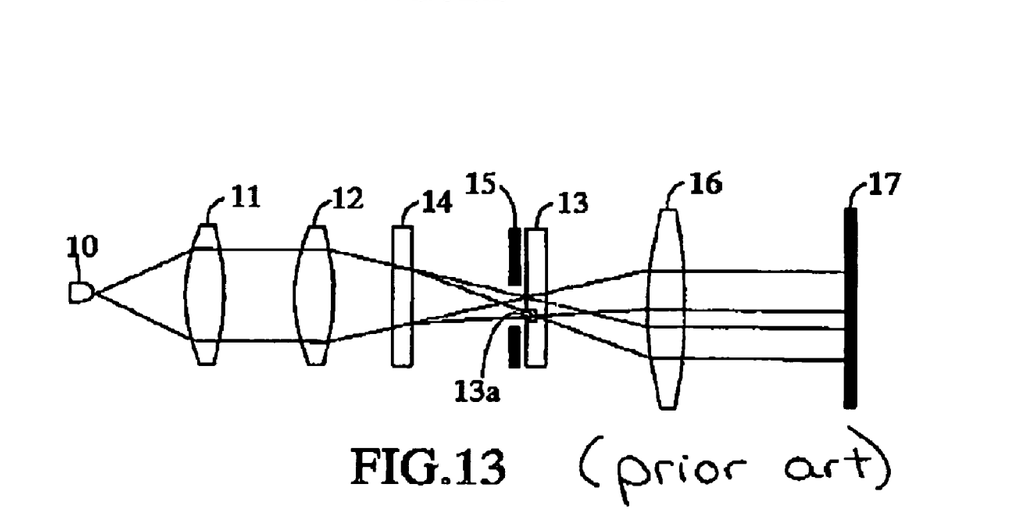
FIG. 13 is a schematic view of a conventional interferometer.

Conventionally, various types of interferometers have been well-known for measuring a wavefront of a beam, one of which is disclosed in a patent document (Japanese Unexamined Patent Application No. SHO57-64139). An interferometer disclosed in this patent document is provided with a light source 10, collimating lens 11, test lens 12 that is a subject to be tested and semi-transparent substrate 13 as shown in FIG. 13, wherein divergent light emitted from the light source 10 is converted into parallel beam by the collimating lens 11 and the converted parallel beam is focused on the semi-transparent substrate 13 by the test lens 12.

Arranged between the test lens 12 and the semi-transparent substrate 13 are a diffraction grating 14 for forming plural focal spots on the semi-transparent substrate 13 by plural diffracted lights of zeroth-order, plus and minus first-order or the like and a field stop 15 that blocks the diffracted light of more than zeroth-order and plus first-order, whereby the focal spots by the zeroth-order diffracted light and first-order diffracted light are formed on the semi-transparent substrate 13. A pinhole 13a is formed at the focal position of the first-order diffracted light on the semi-transparent substrate 13. A reference wavefront generated by the first-order diffracted light passing through the pinhole 13a and a wavefront generated by the zeroth-order diffracted light passing through the semi-transparent substrate 13 are overlapped with each other on a field lens 16, thereby forming interference fringes on an imaging device 17.

However, the pinhole 13a for producing the reference wavefront is formed on the semi-transparent substrate 13 in the above-mentioned conventional device, so that a part of the first-order diffracted light produces the reference wavefront on the pinhole 13a but a part thereof passes therethrough with a wavefront including an aberration. As a result, a contrast of the interference fringes observed on the imaging device 17 is remarkably deteriorated, thereby deteriorating an accuracy of the wavefront measurement by this interferometer. In case where a coherency of the light source is low such as a semiconductor laser, in particular, a sufficient contrast cannot be obtained in the interference fringes.

SUMMARY OF THE INVENTION

The present invention is accomplished in view of the above-mentioned problem, and aims to provide an interferometer having improved an accuracy of a wavefront measurement by enhancing a contrast of interference fringes observed on an imaging device.

In order to attain the aforesaid object, a feature of the present invention is an interferometer comprising beam splitting means for splitting incident beam into first and second split beams, a first lens for converging the first and second split beams onto first and second focal spots respectively, a transparent substrate that is arranged opposite to the first lens at a position in an optical axis direction where the first and second focal spots are formed and has an opaque zone provided in the vicinity of the position where the second focal spot is formed, the opaque zone having a pinhole whose central position is a central position of the second focal spot, a second lens for converting a first divergent beam diverged from the first focal spot into a first parallel beam and for converting a second divergent beam diverged from the pinhole into a second parallel beam, and an imaging device for observing interference fringes produced by an optical interference between the first parallel beam and the second parallel beam.

In the present invention thus configured, the pinhole transmits only a part of the second split beam converged on the second focal spot and the opaque zone surrounding the pinhole prevents the transmission of the other second split beam, whereby the second split beam passing through the transparent micro fraction of the pinhole forms a reference wavefront having only an extremely small aberration (i.e., having substantially no aberration). Accordingly, the interference between the second split beam forming the reference wavefront having substantially no aberration and the first split beam passing through the transparent substrate enhances a contrast of the interference fringes observed on the imaging device, and consequently, an accuracy of a wavefront measurement can be improved. Further, the first and second split beams have strong intensity for passing through the transparent substrate, so that clear interference fringes are formed on the imaging device, thereby improving an accuracy of a wavefront measurement. Even in a case where a coherency of a light source is so low such as a semiconductor laser, in particular, a sufficient contrast can be obtained on the interference fringes. As a result, if the incident beam is defined as a test subject, a wavefront aberration of the incident beam can be satisfactorily detected. Further, if the first lens is defined as a test subject, a performance of the lens can be satisfactorily detected.

In this case, the opaque zone formed on the transparent substrate may be formed in a disk shape. Moreover, the diameter of the second focal spot may be set greater than the diameter of the pinhole but smaller than the diameter of the opaque zone. Making the diameter of the pinhole small particularly enables to provide the second split beam having little aberration, that passes through the pinhole to forms the reference wavefront, thereby being capable of improving an accuracy in measuring the wavefront aberration.

Further, another feature of the present invention is an interferometer comprising beam splitting means for splitting incident beam into first and second split beams, a beam splitter that reflects the split first and second split beams in an approximately orthogonal direction and transmits a beam incident thereto from the orthogonal direction, a mirror that has a reflective surface approximately perpendicular to the first and second split beams reflected by the beam splitter and has a transparent zone formed on a part of the reflective surface, the transparent zone having a circular micromirror at its central position, a lens interposed between the beam splitter and the mirror for converging the first split beam on the reflective surface surrounding the transparent zone to thereby form a first focal spot as well as for converging the second split beam on a reflective surface of the circular micromirror to thereby form a second focal spot, wherein first and second divergent beams diverged from the first and second focal spots are converted into first and second parallel beams to reach the beam splitter, and an imaging device that receives the first and second parallel beams passing through the beam splitter for observing interference fringes produced by an optical interference between the first and second parallel beams.

In the other feature of the present invention thus configured, the circular micromirror reflects only a part of the second split beam converged on the second focal spot and the transparent zone surrounding the circular micromirror transmits the other second split beam, whereby the second split beam reflected by the circular micromirror forms a reference wavefront having only an extremely small aberration (i.e., having substantially no aberration). Accordingly, the interference between the second split beam forming the reference wavefront having substantially no aberration and the first split beam reflected by the mirror enhances a contrast of the optical interference fringes observed on the imaging device, and consequently, an accuracy of a wavefront measurement can be improved. Further, the first and second split beams have strong intensity for being reflected by the mirror, so that clear interference fringes are formed on the imaging device, thereby improving an accuracy of a wavefront measurement. Even in a case where a coherency of a light source is so low such as a semiconductor laser, in particular, a sufficient contrast can be obtained on the interference fringes. As a result, if the incident beam is defined as a test subject, a wavefront aberration of the incident beam can be satisfactorily detected. Further, if the lens is defined as a test subject, a performance of the lens can be satisfactorily detected.

Moreover, still another feature of the invention is an interferometer comprising beam splitting means for splitting incident beam into first and second split beams, a beam splitter that transmits the first and second split beams and reflects a beam incident thereto from the transmitting direction in an orthogonal direction, a mirror that has a reflective surface approximately perpendicular to the first and second split beams passing through the beam splitter and has a transparent zone formed on a part of the reflective surface, the transparent zone having a circular micromirror at its central position, a lens interposed between the beam splitter and the mirror for converging the first split beam on the reflective surface surrounding the transparent zone to thereby form a first focal spot as well as for converging the second split beam on a reflective surface of the circular micromirror to thereby form a second focal spot, wherein first and second divergent beams diverged from the first and second focal spots are converted into first and second parallel beams to reach the beam splitter, and an imaging device that receives the first and second parallel beams reflected by the beam splitter for observing interference fringes produced by an optical interference between first and second parallel beams.

According to this configuration too, the circular micromirror reflects only a part of the second split beam converged on the second focal spot and the transparent zone surrounding the circular micromirror transmits the other second split beam, whereby the second split beam reflected by the circular micromirror forms a reference wavefront having only an extremely small aberration (i.e., having substantially no aberration). Accordingly, an effect equivalent to that of the above-mentioned other feature of the present invention can be expected.

In the present invention using the mirror, the transparent zone formed on the mirror may be formed in a disk shape. Moreover, the diameter of the second focal spot may be set greater than the diameter of the micromirror but smaller than the diameter of the transparent zone. Making the diameter of the micromirror small particularly enables to provide the second split beam having little aberration, that is reflected by the micromirror to form the reference wavefront, thereby being capable of improving an accuracy in measuring the wavefront.

Further, the beam splitting means can be configured by, for example, a diffraction grating. In this case, the cross section of the diffraction grating may be formed like a staircase or like a saw tooth. In this diffraction grating, for example, the first split beam is zeroth-order diffracted light by the diffraction grating, and the second split beam is plus or minus first-order diffracted light by the diffraction grating. Forming the section of the diffraction grating into a shape like a staircase or like a saw tooth as described above enables to effectively produce the zeroth-order diffracted light and plus or minus first-order diffracted light.

Additionally, the beam splitting means may be configured by a wedge-type prism having a first face (a front side) that reflects a part of the incident beam to produce the first split beam and a second face (a bottom side) that reflects the beam passing through the first face to produce the second split beam. This can form the beam splitting means by a wedge-type prism having a simple construction, thereby being capable of providing a simplified construction of the entire device.

Moreover, in the interferometer described above, the intensity ratio of the second split beam to the first split beam is preferably set within the range from 1.1 to 5.0. This setting can form clear interference fringes on the imaging device, thereby enhancing an accuracy of the wavefront measurement.

DESCRIPTION OF THE PREFERRED EMBODIMENT

First Embodiment

Figure 1:
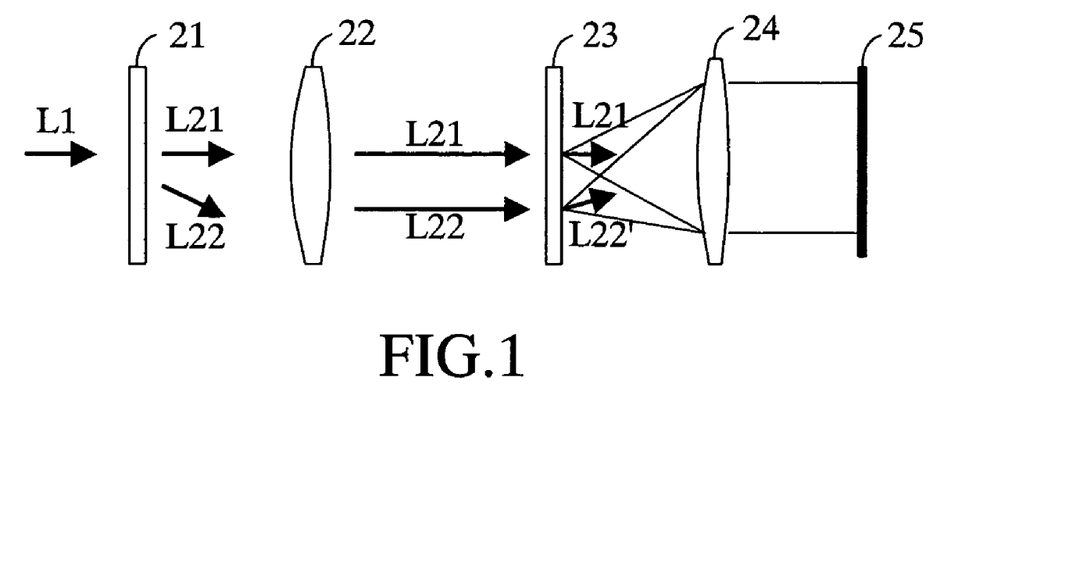
FIG. 1 is a schematic view of an interferometer according to a first embodiment of the present invention.

A first embodiment of the present invention will be explained herein below with reference to drawings. FIG. 1 schematically shows an interferometer according to the first embodiment for testing a performance of an incident beam L1. This interferometer has a diffraction grating 21 functioning as beam splitting means, a condenser lens 22 functioning as a first lens, a transparent substrate 23, a field lens 24 functioning as a second lens and an imaging device 25 arranged in this order.

Figure 2:
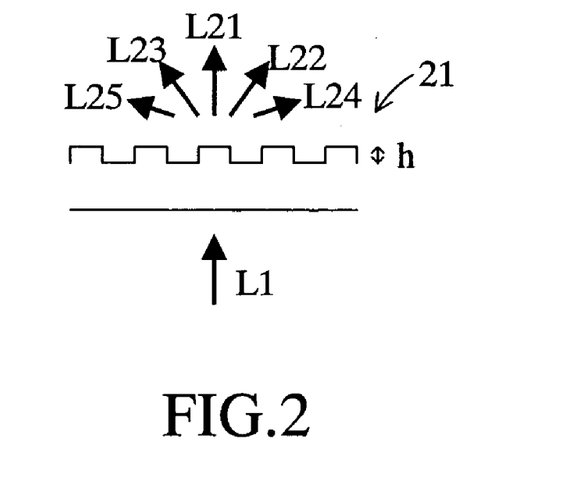
FIG. 2 is a schematic sectional view of a diffraction grating in FIG. 1.

The diffraction grating 21 has a cross section of a rectangular wave as shown in FIG. 2 that is a schematic sectional view. It produces a zeroth-order diffracted light L21, plus first-order diffracted light L22, minus first-order diffracted light L23, plus third-order diffracted light L24, minus third-order diffracted light L25 or the like with respect to the incident beam L1. It is to be noted that the diffracted lights used in this first embodiment are the zeroth-order diffracted light L21 and the plus first-order diffracted light L22, so that the diffracted lights of the other order are unnecessary. This diffraction grating 21 makes the intensity of the zeroth-order diffracted light L21 "0" when a height h is odd-number times of $\lambda/2(n-1)$ wherein the height of rectangular wave of its cross section is defined as h, a wavelength of the incident beam L1 is defined as $\lambda$ and an optical refractive index of a transparent plate composing the thickness section of the diffraction grating 21 is defined as n. Changing the height h can change an intensity ratio of the first-order diffracted light L22 to the zeroth-order diffracted light L21. In the first embodiment, only a part of the first-order diffracted light L22 reaches the field lens 24 by an opaque zone 23a of the transparent substrate 23 described later, so that the intensity ratio is preferably set within the range from 1.1 to 5.0.

The condenser lens 22 forms each focal spot of the zeroth-order diffracted light L21 and the first-order diffracted light L22 generated from the incident beam L1 on the transparent substrate 23.

Figure 3:
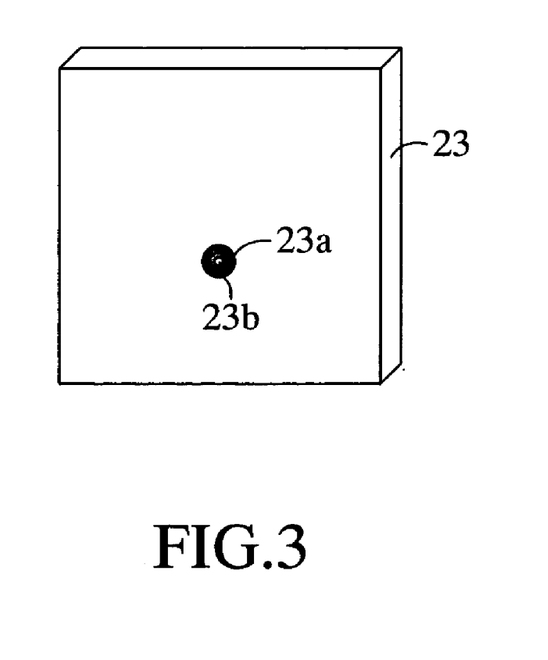
FIG. 3 is a schematic perspective view of a transparent substrate in FIG. 1.
Figure 4:
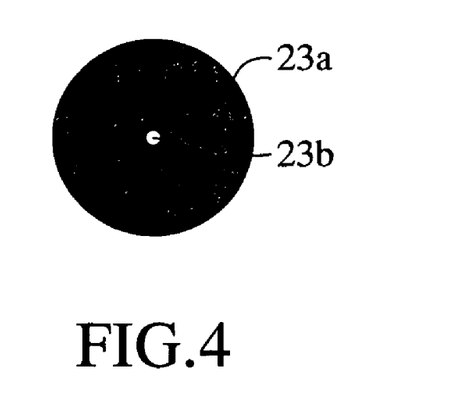
FIG. 4 is an enlarged view of an opaque zone in FIG. 3.

The transparent substrate 23 is arranged opposite to the condenser lens 22 and at the position in the optical axis direction where both focal spots of the zeroth-order diffracted light L21 and the first-order diffracted light L22 are formed. As shown in FIGS. 3 and 4, formed on the transparent substrate 23 is a circular opaque zone 23a whose central position is the central position of the focal spot of the first-order diffracted light L22. Formed at the center of the opaque zone 23a is a pinhole 23b whose central position is the central position of the focal spot of the first-order diffracted light L22 for producing a reference light L22' having only an aberration extremely smaller than that of the first-order diffracted light L22 (i.e., having substantially no aberration). In this case, the diameter of the focal spot by the first-order diffracted light L22 is greater than the diameter of the pinhole 23b but smaller than the diameter of the opaque zone 23a.

The field lens 24 converts the zeroth-order diffracted light L21 and the reference light L22' passing through the transparent substrate 23 to parallel beams, and directs the parallel beams to impinge on the imaging device 25. The imaging device 25 displays interference fringes formed by the zeroth-order diffracted light L21 and the reference light L22' as an image.

In the first embodiment having the above-mentioned configuration, the incident beam L1 that is a test subject is split into the zeroth-order diffracted light L21 and the first-order diffracted light L22 by the diffraction grating 21 to be passed through the condenser lens 22, whereupon the condenser lens 22 converges the zeroth-order diffracted light L21 and the first-order diffracted light L22 such that each focal spot of the split zeroth-order diffracted light L21 and the first-order diffracted light L22 is formed on the transparent substrate 23. In this case, the focal spot of the zeroth-order diffracted light L21 is formed at transparent area outside of the opaque zone 23a of the transparent substrate 23, while the focal spot of the first-order diffracted light L22 is formed on the position of the pinhole 23b of the transparent substrate 23.

The zeroth-order diffracted light L21 is, after passing through the transparent substrate 23, diverged to reach the field lens 24 as a test beam in which the initial wavefront of the incident beam L1 is kept. On the other hand, upon passing through the pinhole 23b, the first-order diffracted light L22 is converted into the reference light L22' functioning as a reference wavefront having only an extremely small aberration (i.e., having substantially no aberration) and diverged to to reach the field lens 24. These zeroth-order diffracted light L21 and the reference light L22' are converted into parallel beams by the field lens 24, thereby forming the interference fringes on the imaging device 25. Accordingly, the observation of these interference fringes enables to calculate the aberration of the incident beam L1 that is under a test.

The first embodiment thus operated allows to pass only the first-order diffracted light L22 converged on the pinhole 23b and prevents the transmission of the first-order diffracted light L22 converged on the opaque zone 23a. Accordingly, the reference light L22' passing through the transparent substrate 23 forms the reference wavefront having only an extremely small aberration (having substantially no aberration). Therefore, the contrast of the interference fringes observed on the imaging device 25 is enhanced by the optical interference between the reference light L22' with the reference wavefront and the zeroth-order diffracted light L21 passing though the transparent substrate 23 and functioning as the test beam, thereby improving an accuracy of the wavefront measurement. Further, the zeroth-order diffracted light L21 and the reference light L22' both keep on retaining a strong intensity for passing through the transparent substrate 23, so that clear interference fringes are formed on the imaging device 25, thereby improving an accuracy of the wavefront measurement. Even in case where a coherency of the light source is so low such as a semiconductor laser, in particular, a sufficient contrast can be obtained on the interference fringes. As a result, a wavefront aberration of the incident beam L1 can be satisfactorily detected.

Second Embodiment

Figure 5:
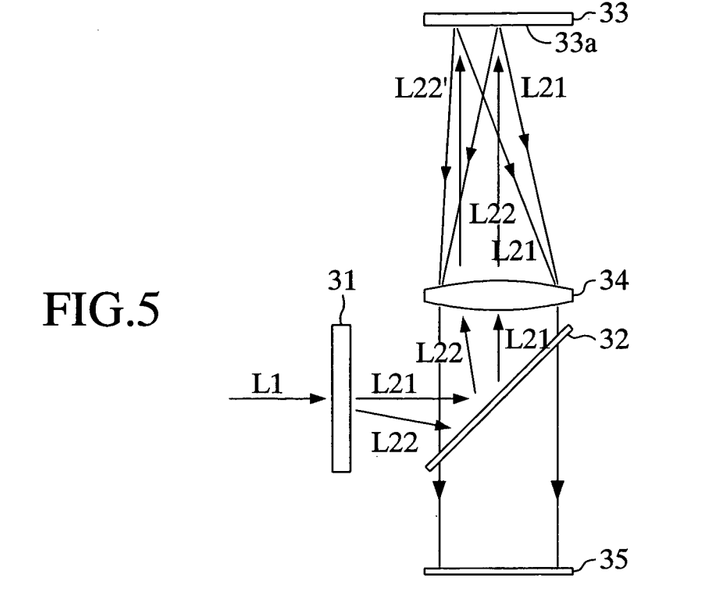
FIG. 5 is a schematic view of an interferometer according to a second embodiment of the present invention.

Subsequently, a second embodiment of the invention will be explained with reference to drawings. FIG. 5 schematically shows an interferometer according to the second embodiment for testing a performance of the incident beam L1. This interferometer is provided with a diffraction grating 31, beam splitter 32, mirror 33, lens 34 and imaging device 35.

The diffraction grating 31 has the same configuration as that of the diffraction grating 21 in the first embodiment and has the same function as that of the diffraction grating 21. It is to be noted that the diffracted lights used in this second embodiment too are the zeroth-order diffracted light L21 and the plus first-order diffracted light L22, so that the diffracted lights of the other order are unnecessary. Further, in this second embodiment too, only a part of the first-order diffracted light L22 reaches the imaging device 35 due to a transparent zone 33b of the mirror 33 described later, so that it is preferable to set the intensity ratio of the plus first-order diffracted light L21 to the zeroth-order diffracted light L21 within the range from 1.1 to 5.0.

Figure 6:
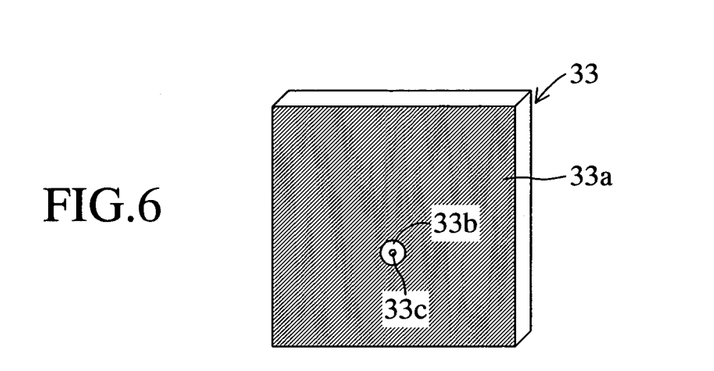
FIG. 6 is a schematic perspective view of a mirror in FIG. 5.
Figure 7:
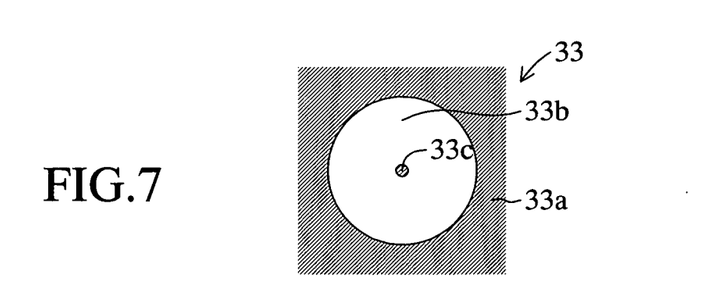
FIG. 7 is an enlarged view of a transparent zone in FIG. 6.

Further, the beam splitter 32 reflects the zeroth-order diffracted light L21 and the plus first-order diffracted light L22 split by the diffraction grating 31 respectively in an approximately orthogonal direction and transmits the beam reflected by the mirror 33 and propagated from the orthogonal direction. The mirror 33 is arranged so as to be spaced apart from the beam splitter 32 by a predetermined distance in the direction of the reflection of the zeroth-order diffracted light L21 and the plus first-order diffracted light L22. It has a reflective surface 33a approximately perpendicular to the zeroth-order diffracted light L21 and the plus first-order diffracted light L22 reflected by the beam splitter 32. As shown in FIGS. 6 and 7, formed on this reflective surface 33b is a circular transparent zone 33b that transmits the incident light so that it does not reflect the same. Provided on the transparent zone 33b is a circular micromirror 33c (circular, extremely small mirror) whose central position is the central position of the transparent zone 33b for producing a reference light L22' having only an aberration extremely smaller than that of the first-order diffracted light L22 (i.e., having substantially no aberration). In this case, the diameter of the focal spot by the first-order diffracted light L22 formed by the lens 34 described later is greater than the diameter of the circular micromirror 33c but smaller than the diameter of the transparent zone 33b.

The lens 34 is interposed between the beam splitter 32 and the mirror 33, wherein it converges the zeroth-order diffracted light L21 on the reflective surface 33a of the mirror 33 that is surrounding the transparent zone 33b to thereby form the first focal spot while it converges the plus first-order diffracted light L22 onto the micromirror 33c to thereby form the second focal spot. Further, the lens 34 converts the zeroth-order diffracted light L21 and the reference light L22' reflected from the first and second focal spots by the mirror 33 into parallel beams, and directs the parallel beams to reach the imaging device 35 via the beam splitter 32. The imaging device 35 has the same configuration as the imaging device 25 in the first embodiment.

In the second embodiment having the above-mentioned configuration, the incident beam L1 that is a test subject is split into the zeroth-order diffracted light L21 and the first-order diffracted light L22 by the diffraction grating 31 to reach the beam splitter 32, whereupon the incident zeroth-order diffracted light L21 and the first-order diffracted light L22 are reflected by the beam splitter 32 to to reach the lens 34. The lens 34 converges the zeroth-order diffracted light L21 and the first-order diffracted light L22 such that each focal spot of the incident zeroth-order diffracted light L21 and the first-order diffracted light L22 is formed on the mirror 33. In this case, the focal spot of the zeroth-order diffracted light L21 is formed on the reflective surface 33a surrounding the transparent zone 33b of the mirror 33, while the focal spot of the first-order diffracted light L22 is formed on the circular micromirror 33c of the mirror 33.

The zeroth-order diffracted light L21 is reflected on the reflective surface 33a and diverged therefrom to to reach the lens 34 as a test beam in which the initial wavefront of the incident beam L1 is kept. On the other hand, upon being reflected by the circular micromirror 33c, the first-order diffracted light L22 is converted into the reference light L22' functioning as a reference wavefront having only an extremely small aberration (i.e., having substantially no aberration) and diverged to to reach the lens 34. These zeroth-order diffracted light L21 and the reference light L22' are converted into parallel beams by the lens 34, thereby forming the interference fringes on the imaging device 35. Accordingly, the observation of these interference fringes enables to calculate the wavefront aberration of the incident beam L1 that is under a test.

In the second embodiment thus operated, the circular micromirror 33c reflects only a part of the first-order diffracted light L22 converged on the second focal spot while the transparent zone 33b surrounding the circular micromirror 33c transmits the other plus first-order diffracted light L22, whereby the reference light L22' reflected by the mirror 33, i.e., by the circular micromirror 33c generates the reference wavefront having only an extremely small aberration (having substantially no aberration). Therefore, the contrast of the interference fringes observed on the imaging device 35 is enhanced by the optical interference between the reference light L22' with the reference wavefront and the zeroth-order diffracted light L21 reflected by the mirror 33, thereby improving an accuracy of the wavefront measurement. Further, the zeroth-order diffracted light L21 and the reference light L22' both keep on retaining a strong intensity for being reflected by the mirror 33, so that clear interference fringes are formed on the imaging device 35, thereby improving an accuracy of the wavefront measurement. Even in case where a coherency of the light source is so low such as a semiconductor laser, in particular, a sufficient contrast can be obtained on the interference fringes. As a result, if the incident beam L1 is defined as a test subject, a wavefront aberration of the incident beam L1 can be satisfactorily detected.

Third Embodiment

Figure 8:
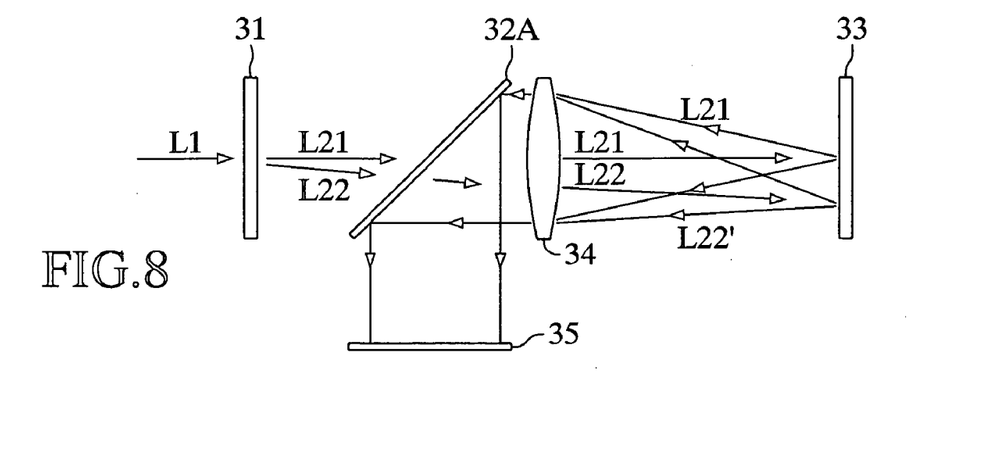
FIG. 8 is a schematic view of an interferometer according to a third embodiment of the present invention.

Subsequently, a third embodiment of the invention will be explained with reference to drawings. FIG. 8 schematically shows an interferometer according to the third embodiment. This interferometer utilizes a beam splitter 32A instead of the beam splitter 32. The beam splitter 32A transmits the zeroth-order diffracted light L21 and the plus first-order diffracted light L22 split by the diffraction grating 31 respectively to thereby allow these lights to reach the lens 34. And also, the beam splitter 32A reflects the zeroth-order diffracted light L21 and reference light L22' propagated thereto from the lens 34 in the orthogonal direction to reach the imaging device 35. The other components are same as those in the second embodiment, so that they are given by the same numerals as in the second embodiment for omitting the explanation thereof.

In the third embodiment having the above-mentioned configuration too, the incident beam L1 that is a test subject is split into the zeroth-order diffracted light L21 and the first-order diffracted light L22 by the diffraction grating 31 to to reach the beam splitter 32A. The incident zeroth-order diffracted light L21 and the first-order diffracted light L22 pass through the beam splitter 32A, whereby, due to the lens 34, a focal spot by the zeroth-order diffracted light L21 is formed on the reflective surface 33a surrounding the transparent zone 33b of the mirror 33 while a focal spot by the first-order diffracted light L22 is formed on the circular micromirror 33c of the mirror 33.

In this case too, the mirror 33 functions like that in the aforesaid second embodiment, whereby the zeroth-order diffracted light L21 and the reference light L22' diverged from the mirror 33 are incident upon the lens 34. The zeroth-order diffracted light L21 and the reference light L22' converted into parallel beams by the lens 34 are reflected in the orthogonal direction by the beam splitter 32A, thereby forming interference fringes on the imaging device 35. Accordingly, in this case too, the observation of these interference fringes enable to calculate the wavefront aberration of the incident beam L1 that is under a test.

In the third embodiment thus operated too, the reference light L22' reflected by the mirror 33, i.e., by the circular micromirror 33c forms the reference wavefront having only an extremely small aberration (having substantially no aberration). Therefore, the same effect as that of the interferometer according to the second embodiment can be expected by the interferometer according to this third embodiment.

The first to third embodiments of the present invention have been explained in detail so far, but the embodiment of the present invention is not limited to the first to third embodiments. Various modifications are possible without departing from the scope of the present invention.

For example, the section of the diffraction gratings 21 and 31 are shaped into a rectangular wave (see FIG. 2) in the first to third embodiments. However, in the first to third embodiments, the light diffracted by the diffraction grating 21 includes the zeroth-order diffracted light L21 and the plus first-order diffracted light L22, and further includes the minus first-order diffracted light L23, plus third-order diffracted light L24 and minus third-order diffracted light L25, thus inefficient. In order to solve this problem, a diffraction grating 41 having a cross section shaped like a staircase shown in FIG. 9 can be used instead of the diffraction gratings 21 and 31. The use of the diffraction grating 41 allows that the light diffracted by the diffraction grating 41 includes mainly the zeroth-order diffracted light L21 and the plus first-order diffracted light L22 (or mainly the zeroth-order diffracted light L21 and the minus first-order diffracted light L23), thereby improving using efficiency of the diffracted light.

Figure 10:
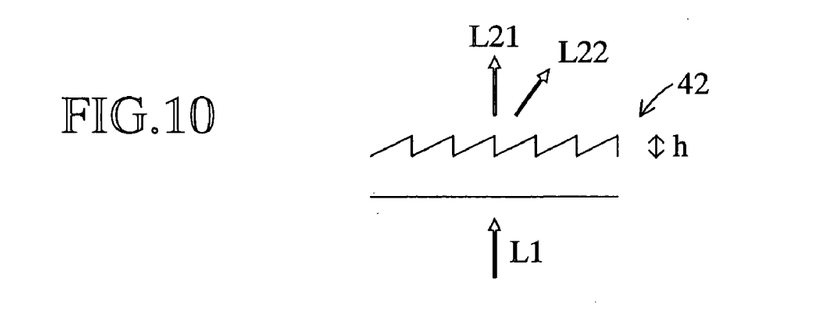
FIG. 10 is a schematic sectional view of another diffraction grating according to a modified example of the first to third embodiments.

Further, a diffraction grating 42 having a cross section shaped like a saw tooth shown in FIG. 10 can be used instead of the diffraction gratings 21 and 31. The use of the diffraction grating 42 allows that the light diffracted by the diffraction grating 42 includes mainly the zeroth-order diffracted light L21 and the plus first-order diffracted light L22 (or mainly the zeroth-order diffracted light L21 and the minus first-order diffracted light L23), thereby improving using efficiency of the diffracted light. Moreover, in the case of using these diffraction gratings 41 and 42, the intensity ratio of the first-order diffracted light L22 to the zeroth-order diffracted light L21 can be adjusted, like the above-mentioned embodiments, by changing a height h of the staircase shape and the saw tooth shape. In these modified embodiments too, the intensity ratio of the first-order diffracted light L22 to the zeroth-order diffracted light L21 is preferably set within a range from 1.1 to 5.0 by the modification of this height h.

Figure 11:
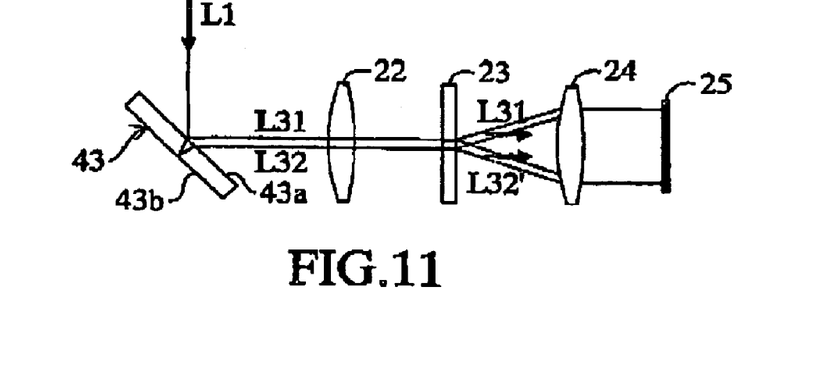
FIG. 11 is a schematic view of an interferometer according to a modified example of the first embodiment.

Further, a wedge-type reflecting prism can be used instead of these diffraction gratings 21 and 31. FIG. 11 shows an example where a wedge-type reflecting prism 43 is used instead of the diffraction grating 21 of the first embodiment. This wedge-type reflecting prism 43 reflects a part of the incident beam L1 that is under a test on its front surface 43a to produce a first split beam L31. Further, this wedge-type reflecting prism 43 reflects a part of the incident beam L1 on its back surface 43b (inner back surface 43b) to produce a second split beam L32. The other configurations are the same as those in the above-mentioned embodiments. Specifically, due to the condenser lens 22, a focal spot of the first split beam L31 is formed at the outside area surrounding the opaque zone 23a on the transparent substrate 23 and a focal spot of the second split beam L32 is formed at the position of the pinhole 23b on the transparent substrate 23. The other functions are also the same as those in the first embodiment.

The examples where the wedge-type reflecting prism is used instead of the diffraction grating 31 of the second and third embodiments are not shown in the drawings, but similar to the aforesaid modified example, the wedge-type reflecting prism 43 can be used instead of the diffraction grating 31 shown in FIGS. 5 and 8. Accordingly, in each modified example, clear interference fringes are formed on the imaging device 25 or 35 like the first to third embodiments, thereby enhancing an accuracy of the wavefront measurement. Further, in the interferometer according to these modified examples, the wedge-type reflecting prism 43 can relatively be simple in construction, thereby providing a simplified construction of the entire device.

In the interferometer using the wedge-type reflecting prism 43 too, the intensity ratio of the second split beam L32 to the first split beam L31 is preferably set within the range from 1.1 to 5.0. In this case, a reflectivity of a coating for reflection provided on the front surface 43a and back surface 43b of the wedge-type reflecting prism 43 may suitably be selected and modified.

Further, the zeroth-order diffracted light is used as a test light while the first-order diffracted light is used as a reference light in the first to third embodiments. However, the first-order diffracted light may be used as a test light while the zeroth-order diffracted light may be used as a reference light.

Figure 12:
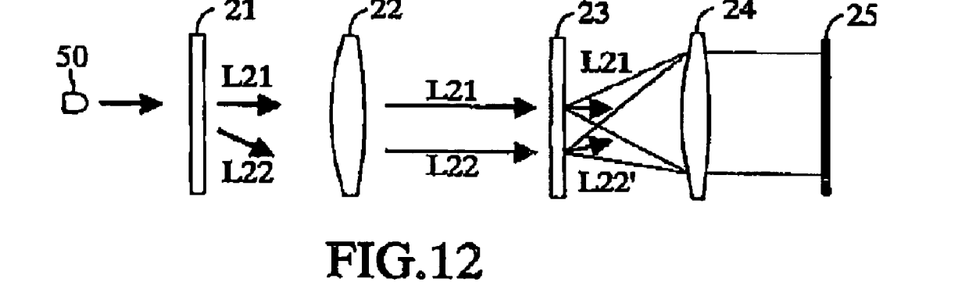
FIG. 12 is a schematic view of an interferometer according to another modified example of the first embodiment.

Further, although the incident beam L1 incident from the other optical equipment or optical component is defined as a test subject in the above-mentioned first to third embodiments and respective modified example thereof, the optical equipment and optical component can be defined as a test subject. For example, the condenser lens 22 in the first embodiment can be defined as the test subject, and the lens 34 in the second and third embodiments can also be defined as the test subject. In case where the condenser lens 22 is defined as the test subject in the first embodiment, the beam L1 from the other optical equipment or optical component is not defined as the incident beam L1, but a light source 50 is provided in the interferometer that corresponds to the incident beam L1 and emits beam having extremely small wavefront aberration (i.e., having substantially no wavefront aberration), as shown in FIG. 12. The other configurations are the same as those in the embodiment shown in FIG. 1. The performance of the condenser lens 22 can be tested based upon interference fringes formed on the imaging device 25.

In case where the lens 34 is defined as the test subject in the second and third embodiments, a beam having extremely small wavefront aberration (i.e., having substantially no wavefront aberration) from the light source 50 in the modified example is incident on the diffraction grating 31 shown in FIGS. 5 and 8, instead of the incident beam L1 from the other optical equipment or optical components.

Figure 9:
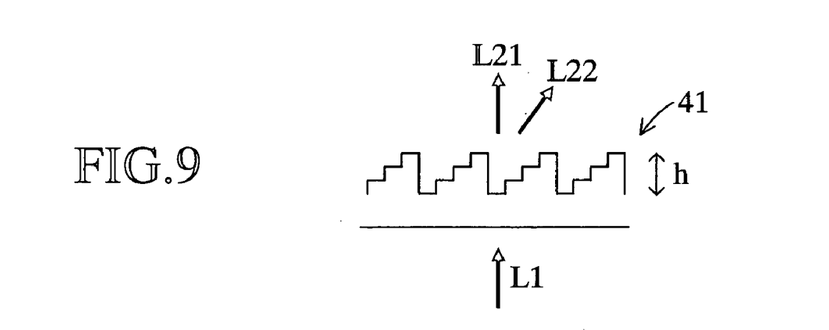
FIG. 9 is a schematic sectional view of a diffraction grating according to a modified example of the first to third embodiments.

It is to be noted that, in the interferometer for testing the performance of the condenser lens 22 and the lens 34, the diffraction gratings 41 and 42 according to the modified example shown in FIGS. 9 and 10 and the wedge-type reflecting prism 43 shown in FIG. 11 can be used like various modified examples of the first to third embodiments.

What is claimed is:

1. An interferometer comprising:
   beam splitting means for splitting an incident beam into first and second split beams;
   a first lens for converging the first and second split beams into first and second focal spots respectively;
   a transparent substrate that is arranged opposite to the first lens at a position on an optical axis direction adjacent to where the first and second focal spots are formed and having an opaque zone provided in a vicinity of a position where the second focal spot is formed, the opaque zone having a pinhole whose central position is a central position of the second focal spot;
   a second lens for converting a first divergent beam diverged from the first focal spot into a first parallel beam and for converting a second divergent beam diverged from the pinhole into a second parallel beam; and
   an imaging device for observing interference fringes produced by an optical interference between the first parallel beam and the second parallel beam, wherein the opaque zone formed on the transparent substrate has a disk shape.

2. An interferometer claimed in claim 1, wherein the diameter of the second focal spot is greater than the diameter of the pinhole and smaller than the diameter of the opaque zone.

3. An interferometer comprising:
   beam splitting means for splitting an incident beam into first and second split beams;
   a first lens for converging the first and second split beams into first and second focal spots respectively;
   a transparent substrate that is arranged opposite to the first lens at a position on an optical axis direction adjacent to where the first and second focal spots are formed and having an opaque zone provided in a vicinity of a position where the second focal spot is formed, the opaque zone having a pinhole whose central position is a central position of the second focal spot;
   a second lens for converting a first divergent beam diverged from the first focal spot into a first parallel beam and for converting a second divergent beam diverged from the pinhole into a second parallel beam; and
   an imaging device for observing interference fringes produced by an optical interference between the first parallel beam and the second parallel beam, wherein the beam splitting means is composed of a wedge-type prism having a first face that reflects a part of the incident beam to produce the first split beam and a second face that reflects the beam passing through the first face to produce the second split beam.

4. An interferometer comprising:
   beam splitting means for splitting an incident beam into first and second split beams;
   a first lens for converging the first and second split beams into first and second focal spots respectively;
   a transparent substrate that is arranged opposite to the first lens at a position on an optical axis direction adjacent to where the first and second focal spots are formed and having an opaque zone provided in a vicinity of a position where the second focal spot is formed, the opaque zone having a pinhole whose central position is a central position of the second focal spot;
   a second lens for converting a first divergent beam diverged from the first focal spot into a first parallel beam and for converting a second divergent beam diverged from the pinhole into a second parallel beam; and
   an imaging device for observing interference fringes produced by an optical interference between the first parallel beam and the second parallel beam, wherein an intensity ratio of the second split beam to the first split beam is set within a range from 1.1 to 5.0.

5. An interferometer comprising:
   beam splitting means for splitting incident beam into first and second split beams;
   a beam splitter that reflects the first and second split beams in an approximately orthogonal direction and transmits a beam incident thereto from the orthogonal direction;
   a mirror that has a reflective surface approximately perpendicular to the first and second split beams reflected by the beam splitter and has a transparent zone formed on a part of the reflective surface, the transparent zone having a circular micromirror at its central zone;
   a lens interposed between the beam splitter and the mirror for converging the first split beam on the reflective surface surrounding the transparent zone to thereby form a first focal spot as well as for converging the second split beam on a reflective surface of the circular micromirror to thereby form a second focal spot, wherein first and second divergent beams diverged from the first and second focal spots are converted into first and second parallel beams to reach the beam splitter; and
   an imaging device that receives the first and second parallel beams passing through the beam splitter for observing interference fringes produced by an optical interference between the first and second parallel beams.

6. An interferometer claimed in claim 5, wherein the transparent zone formed on the mirror has a disk shape.

7. An interferometer claimed in claim 6, wherein the diameter of the second focal spot is greater than the diameter of the micromirror and smaller than the diameter of the transparent zone.

8. An interferometer claimed in 5, wherein the beam splitting means is composed of a diffraction grating.

9. An interferometer claimed in claim 8, wherein the diffraction grating has a cross section shaped like a staircase.

10. An interferometer claimed in claim 8, wherein the diffraction grating has a cross section shaped like a saw tooth.

11. An interferometer claimed in claim 8, wherein the first split beam is zeroth-order diffracted light by the diffraction grating and the second split beam is plus or minus first-order diffracted light by the diffraction grating.

12. An interferometer claimed in claim 5, wherein the beam splitting means is composed of a wedge-type prism having a first face that reflects a part of the incident beam to produce the first split beam and a second face that reflects the beam passing through the first face to produce the second split beam.

13. An interferometer claimed in claim 5, wherein an intensity ratio of the second split beam to the first split beam is set within a range from 2.1 to 5.0.

14. An interferometer comprising:
beam splitting means for splitting incident beam into first and second split beams;
a beam splitter that transmits the first and second split beams and reflects a beam incident thereto from the transmitting direction in an orthogonal direction;
a mirror that has a reflective surface approximately perpendicular to the first and second split beams passing through the beam splitter and has a transparent zone formed on a part of the reflective surface, the transparent zone having a circular micromirror at its central position;
a lens interposed between the beam splitter and the mirror for converging the first split beam on the reflective surface surrounding the transparent zone to thereby form a first focal spot as well as for converging the second split beam on a reflective surface of the circular micromirror to thereby form a second focal spot, wherein first and second divergent beams diverged from the first and second focal spots are converted into first and second parallel beams to reach the beam splitter; and
an imaging device that receives the first and second parallel beams reflected by the beam splitter for observing interference fringes produced by an optical interference between the first and second parallel beams.

15. An interferometer claimed in claim 14, wherein the transparent zone formed on the mirror has a disk shape.

16. An interferometer claimed in claim 15, wherein the diameter of the second focal spot is greater than the diameter of the micromirror and smaller than the diameter of the transparent zone.

17. An interferometer claimed in claim 14, wherein the beam splitting means is composed of a diffraction grating.

18. An interferometer claimed in claim 17, wherein the diffraction grating has a cross section shaped like a staircase.

19. An interferometer claimed in claim 17, wherein the diffraction grating has a cross section shaped like a saw tooth.

20. An interferometer claimed in claim 17, wherein the first split beam is zeroth-order diffracted light by the diffraction grating and the second split beam is plus or minus first-order diffracted light by the diffraction grating.

21. An interferometer claimed in claim 14, wherein the beam splitting means is composed of a wedge-type prism having a first face that reflects a part of the incident beam to produce the first split beam and a second face that reflects the beam passing through the first face to produce the second split beam.

22. An interferometer claimed in claim 14, wherein an intensity ratio of the second split beam to the first split beam is set within a range from 1.1 to 5.0.

* * * * *